United States Patent
Lee et al.

(10) Patent No.: US 11,047,783 B2
(45) Date of Patent: Jun. 29, 2021

(54) FOLDING APPARATUS FOR FLEXIBLE MATERIAL DURABILITY TESTING

(71) Applicant: FlexiGO INC., Cheonan-si (KR)

(72) Inventors: Ki Yong Lee, Cheonan-si (KR); Ki Choul An, Cheonan-si (KR); Dae Sung Kim, Osan-si (KR); Yeon Ung Chu, Cheonan-si (KR)

(73) Assignee: FlexiGO, INC., Cheonan-si (KR)

( * ) Notice: Subject to any disclaimer, the term of this patent is extended or adjusted under 35 U.S.C. 154(b) by 187 days.

(21) Appl. No.: 16/465,280

(22) PCT Filed: Nov. 21, 2017

(86) PCT No.: PCT/KR2017/013296
§ 371 (c)(1),
(2) Date: May 30, 2019

(87) PCT Pub. No.: WO2018/128265
PCT Pub. Date: Jul. 12, 2018

(65) Prior Publication Data
US 2019/0391058 A1    Dec. 26, 2019

(30) Foreign Application Priority Data

Jan. 9, 2017  (KR) .......................... 10-2017-0002967

(51) Int. Cl.
*G01N 3/20* (2006.01)
*G01N 3/04* (2006.01)

(52) U.S. Cl.
CPC ................. *G01N 3/20* (2013.01); *G01N 3/04* (2013.01)

(58) Field of Classification Search
CPC ................................... G01N 3/20; G01N 3/04
See application file for complete search history.

(56) References Cited

U.S. PATENT DOCUMENTS 3,786,673 A * 1/1974 Weissmann ............... G01N 3/00
                                                          73/579
3,906,784 A * 9/1975 Coulstring ............... G01N 3/20
                                                          73/850

(Continued)

FOREIGN PATENT DOCUMENTS

| JP | H06260796 A | 9/1994 |
| JP | H09287359 A | 11/1997 |

(Continued)

*Primary Examiner* — Max H Noori
(74) *Attorney, Agent, or Firm* — Nelson Mullins Riley & Scarborough LLP; Kongsik Kim, Esq.

(57) ABSTRACT

The present invention relates to a folding apparatus for flexible material durability testing, the folding apparatus including: a material fixing part fixing a part of a flexible material to be tested; a pivoting plate spaced apart at a predetermined gap from the material fixing part, and folding or unfolding the flexible material by rotatively moving in a state where the other part of the flexible material is fixed thereon; and a motion controller supporting the pivoting plate to enforce the pivoting plate to rotatively move and to allow the pivoting plate to forwardly or backwardly move with respect to the material fixing part at the same time. In addition, because a miscellaneous force in addition to tensile force is not applied to the material during flexible material durability testing, the testing is highly reliable. Accordingly, the folding apparatus may accurately perform the flexible material durability testing.

5 Claims, 10 Drawing Sheets

(56) References Cited

U.S. PATENT DOCUMENTS

| | | | | |
|---|---|---|---|---|
| 4,008,670 A * | 2/1977 | Price | ................ | A47F 5/13 |
| | | | | 108/28 |
| 4,677,856 A * | 7/1987 | Fischer | ................ | G01N 3/00 |
| | | | | 73/850 |
| 5,419,202 A * | 5/1995 | Howard | ................ | G01N 3/20 |
| | | | | 493/37 |
| 2013/0205911 A1 * | 8/2013 | Wang | ................ | G01N 3/34 |
| | | | | 73/812 |

FOREIGN PATENT DOCUMENTS

| | | | |
|---|---|---|---|
| JP | 2008212555 | A | 9/2008 |
| KR | 200445546 | Y1 | 1/2009 |
| KR | 101489667 | B1 | 2/2015 |
| KR | 101519561 | B1 | 5/2015 |
| KR | 20150139135 | A | 12/2015 |
| KR | 10-2016-0000926 | A | 1/2016 |
| KR | 10-2016-0019600 | A | 2/2016 |

* cited by examiner

FOLDING APPARATUS FOR FLEXIBLE MATERIAL DURABILITY TESTING

CROSS-REFERENCES TO RELATED APPLICATIONS

This application is a U.S. national phase application, pursuant to 35 U.S.C. § 371, of PCT/KR2017/013296, filed Nov. 21, 2017, designating the United States, which claims priority to Korean Application No. 10-2017-0002967, filed Jan. 9, 2017. The entire contents of the aforementioned patent applications are incorporated herein by this reference.

TECHNICAL FIELD

The present invention relates to a folding apparatus for evaluating lifetime of a flexible film-type material and, more particularly, to a folding apparatus for flexible material durability testing, wherein the folding apparatus has a structure capable of repeatedly folding the material.

BACKGROUND ART

For example, conventional display panels used for displays such as televisions, computer monitors, or various portable electronic devices have a flat structure because of the use of a glass substrate having no flexibility, thereby being monotonous and having a limitation of applications thereof.

For this reason, and also thanks to the development of science and technology, a so-called flexible display device capable of being bent using a flexible material such as plastic and the like instead of a glass substrate having no flexibility has been developed and produced. For example, a flexible display panel technology capable of being folded or rolled up like a scroll has also been developed.

For example, US Patent Application Publication No. US2014/0247544 "ROLL-TYPE FLEXIBLE DEVICE FOR DISPLAYING" has disclosed a technique of winding a flexible display part on a roll inside a housing using a rod assembly in which a plurality of rods having a rotatable X-shape are connected.

The display elements used in the various types of flexible display devices include a TFT LCD, an organic EL, electrophoresis, or the like. Because the durability of the material (hereinafter, referred to flexible material) to be applied to the display elements is directly related to lifetime of a product, durability testing for selected material is essentially performed prior to a product design.

There are various kinds of the durability testing, and folding testing is included among the testing types. The folding testing is a test that repeatedly folds and unfolds a flexible material. For example, a device, which mechanically forces a pivoting plate to rotatively move in a state where a part of a flexible material specimen is fixed on a fixed plate and a part of the rest of the flexible material specimen is fixed on the pivoting plate has been also used.

However, this type of folding device was not able to accurately perform the folding testing. This was due to inability to block the tensile force being applied on the flexible material during the rotative movement of the pivoting plate. The fact that the pure folding operation alone may not be realized causes the reliability of the test to be seriously degraded.

In conventional art documents, Korean Patent No. 10-1349789 "Testing Device for Bending FPCB" and Korean Patent Application Publication No. 10-2016-0087143 "Apparatus for durability test of solar cell module folding" are disclosed.

DISCLOSURE

Technical Problem

Accordingly, the present invention has been made to solve the above problems, and an object of the present invention is to provide the folding apparatus for flexible material durability testing, which has high reliability in testing because a miscellaneous force in addition to tensile force is not applied to the material during flexible material durability testing and, accordingly, can accurately perform the flexible material durability testing.

Technical Solution

In order to accomplish the above objective, the present invention provides a folding apparatus for flexible material durability testing, the folding apparatus including: a material fixing part fixing a part of a flexible material to be tested; a pivoting plate spaced apart at a predetermined gap from the material fixing part and folding or unfolding the flexible material by rotatively moving in a state where the other part of the flexible material is fixed thereon; and a motion controller supporting the pivoting plate to enforce the pivoting plate to rotatively move and to allow the pivoting plate to forwardly or backwardly move with respect to the material fixing part at the same time.

In addition, the material fixing part includes a fixed plate provided with a tight contact surface tightly brought into contact with the flexible material.

In addition, the motion controller includes: a pivoting axle positioned to have an extension line thereof passing through a midway point between the fixed plate and the pivoting plate; a support body supported by the pivoting axle and rotatively moving together with the pivoting plate in a state of accommodating the pivoting plate in an internal zone thereof; and a sliding mechanism positioned between the support body and the pivoting plate and supporting the pivoting plate to forwardly or backwardly move.

Further, the support body or the pivoting plate is provided with guide holes extending in a longitudinal direction, and the sliding mechanism includes connection members provided on the pivoting plate or the support body, inserted in the guide holes, respectively, and moving along the longitudinal direction of the guide holes.

In addition, the support body is provided with elongated holes extending in a direction perpendicular to a moving path of the support body, the pivoting plate is further provided with follower pins extending horizontally through the elongated holes, respectively, and a side bracket provided with a guide slot for guiding the follower pin at the time of rotative movement of the pivoting plate is provided at each side of the support body.

In addition, the tight contact surface, on which the flexible material is tightly fixed, is placed on the upper surface of the pivoting plate. Here, the tight contact surface of the pivoting plate is positioned on the same plane as the tight contact surface of the fixed plate before the pivoting plate rotatively moves and, in a state where the pivoting plate completes the rotative movement, maintains a state of being spaced apart in parallel from the tight contact surface of the fixed plate. Meanwhile, the extension line of the pivoting axle is spaced apart in parallel with respect to the flexible material, wherein a separation distance therebetween is nRo, which is a gap between both tight contact surfaces.

Advantageous Effects

Because a miscellaneous force in addition to tensile force is not applied to the material during the flexible material durability testing, the testing is highly reliable. Accordingly, the folding apparatus for flexible material durability testing of the present invention as described above may accurately perform the flexible material durability testing.

MODE FOR INVENTION

Hereinafter, one embodiment according to the present invention will be described in detail with reference to the accompanying drawings.

A folding device 31 according to the present embodiment to be described later is a testing device used for evaluating lifetime and durability of various flexible film-type materials including a flexible display. The folding device 31 repeats the operation of repeatedly folding and unfolding the flexible material.

In particular, the folding device 31 is configured to be capable of obtaining accurate measurement values by removing an influence of tensile force in the flexible material during such folding and unfolding operations, wherein the tensile force results from a mismatch between a center point S of a circle whose circumference includes a bending portion 15a of the flexible material and a center point Z of a circle whose circumference includes a moving path of a pivoting plate 13.

Figure 1:
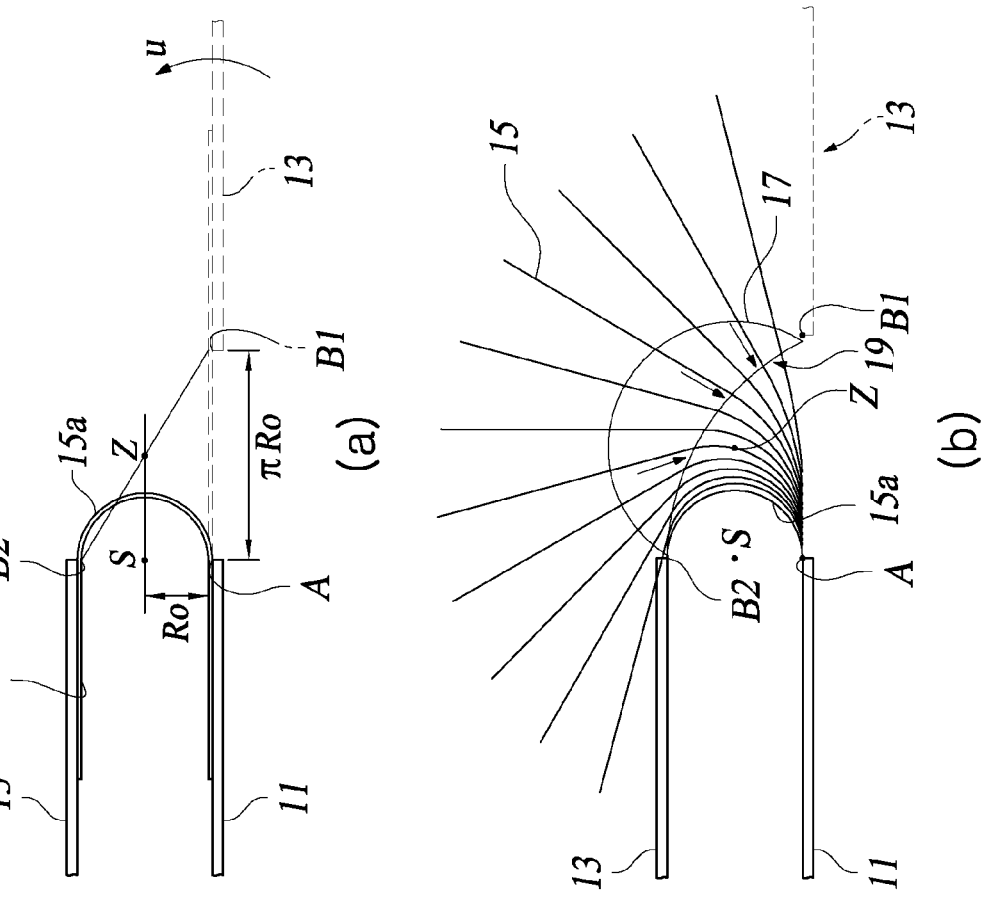
FIGS. 1a and 1b are views illustrating a concept of in-folding of a flexible material.

FIGS. 1a and 1b are views illustrating a concept of in-folding of a flexible material.

As shown in these drawings, a flexible material 15 to be tested is tightly fixed on upper surfaces of a fixed plate 11 and the pivoting plate 13, which are spaced apart by a distance of nRo.

The pivoting plate 13 rotatively moves in a direction of an arrow u and an opposite direction thereof with the point Z as a pivot. That is, with the pivot Z as a reference, the pivoting plate 13 reciprocates between the unfolded position located at the side of the fixed plate 11 on the same plane and the fully folded position located in parallel with the upper side of the fixed plate 11.

Naturally, a moving path 17 drawn by the pivoting plate 13 draws a circle having a certain radius with the point Z as a center, wherein the point Z is located at a height of the Ro vertically from the flexible material 15.

In addition, nRo, which is a gap between an end A of the fixed plate 11 and an end B1 of the pivoting plate 13 at the unfolding position, is a length of the circumference of the bending portion 15a at the folding position. That is, the distance nRo is equal to the circumferential length of the semicircle of the circle with the point S as a center.

However, the flexible material 15 moves upwardly about the end A of the fixed plate 11, thereby performing bending operation. Here, when it is assumed that there is no pivoting plate 13, the point B1 follows a material path 19 provided the position of the point B1 is tracked.

As shown in FIG. 1b, there is a difference between the path 17 of the pivoting plate 13 and the path 19 of the point B1. Meanwhile, because the gap of the pivoting plate 13 with respect to the fixed plate 11 is fixed, and the flexible material 15 is fixed on the pivoting plate 13, a tensile force is inevitably applied on the flexible material 15 when the pivoting plate 13 rotatively moves.

Such a tensile force affects the durability testing of the flexible material 15 and acts as an obstructing element in obtaining accurate testing results.

FIGS. 2a and 2b are views illustrating a concept of out-folding of a flexible material.

As shown in FIGS. 2a and 2b, an out-folding test may even be performed by allowing the pivoting plate 13, on which the flexible material 15 is fixed, to rotatively move in a direction of an arrow d. Out-folding refers to a state in which the flexible material 15 is folded outwards and positioned outside the fixed plate 11 and the pivoting plate 13 when folding operation is completed.

Such out-folding may not prevent a phenomenon that a tensile force is generated in the flexible material 15 during the test as in the case of the in-folding. The explanation of the cause of the tensile force occurring in the out-folding test is equal to that occurring in the in-folding test, and the description thereof will be omitted.

Figure 3:
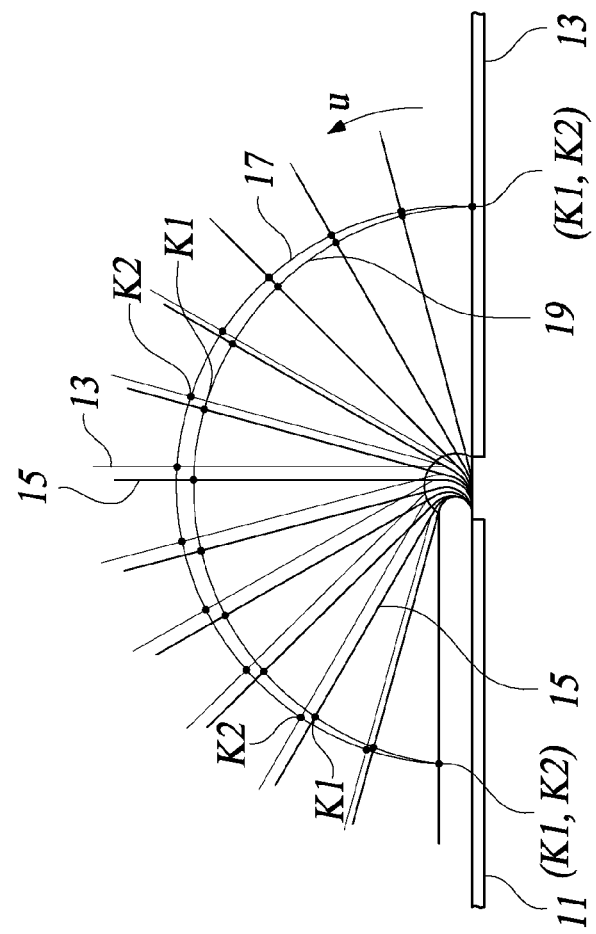
FIG. 3 is a view showing paths of a pivoting plate and a flexible material when bending operation is performed in a folding apparatus for the flexible material durability testing according to an embodiment of the present invention.

FIG. 3 is a view showing paths of a pivoting plate 13 and a flexible material 15 when bending operation is performed in a folding apparatus for the flexible material durability testing according to an embodiment of the present invention. In particular, the movement of the flexible material 15 is drawn under an assumption that the flexible material 15 fixed on the pivoting plate 13 may slide in a state of being in close contact with the pivoting plate 13. The fact that the flexible material 15 may slide means that a tensile force is not applied to the flexible material 15.

As shown in this drawing, an arbitrary point K2 on the pivoting plate 13 that rotatively moves in a direction of the arrow u moves along a moving path 17. On the other hand, an arbitrary point K1 on the flexible material 15 overlaps with K2 at the time of starting but moves along a material path 19 out of the moving path 17 in a process of rotative movement. The reason why the paths of the pivoting plate 13 and the flexible material 15 are different is that the positions of the pivots are different.

However, because the flexible material 15 is fixed on the pivoting plate 13 in reality, the pivoting plate 13 may have no choice but to follow the moving path 17. Accordingly, the tensile force is inevitably applied to the flexible material 15.

The problem of the tensile force like this may be solved in such a way that the flexible material 15 on the pivoting plate 13 is allowed to slidingly move.

Figure 4:
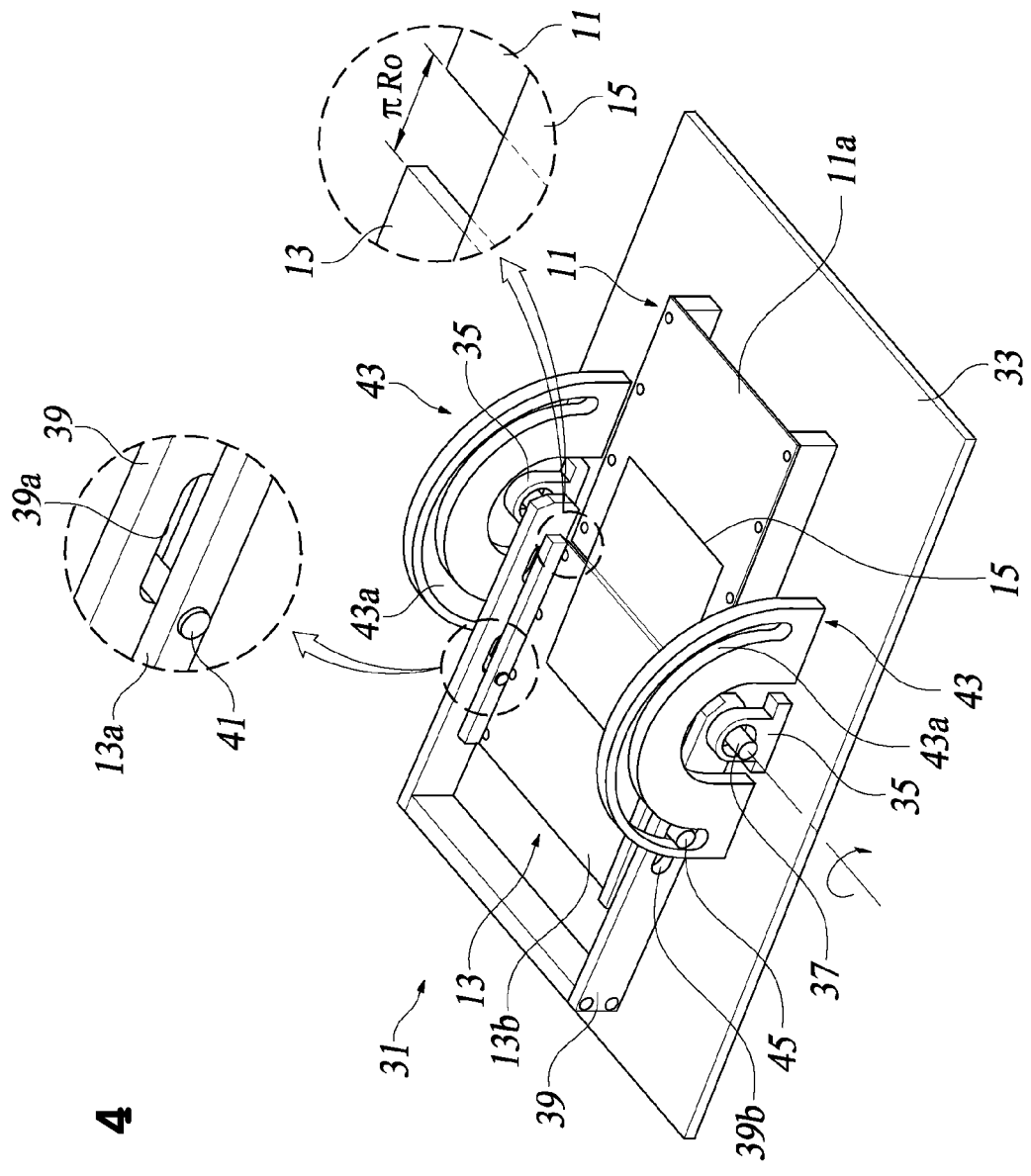
FIG. 4 is a perspective view illustrating a configuration of a folding apparatus for the flexible material durability testing according to an embodiment of the present invention and an operation thereof.
Figure 5:
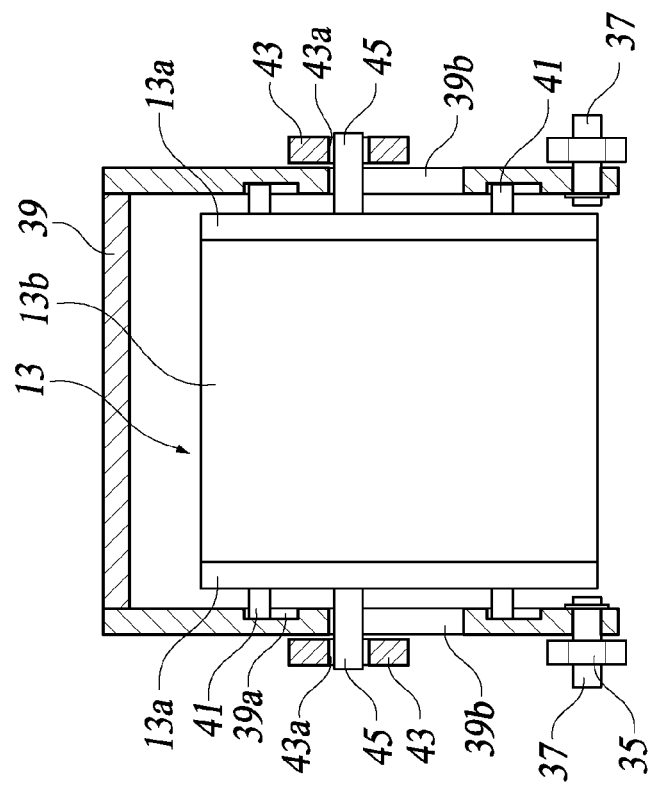
FIG. 5 is a sectional view showing a coupled structure of a pivoting plate 13 with respect to a support body 39 shown in FIG. 4.

FIG. 4 is a perspective view illustrating a configuration of a folding apparatus 31 for the flexible material durability testing according to an embodiment of the present invention. In addition, FIG. 5 is a sectional view showing a coupled structure of a pivoting plate 13 with respect to a support body 39 shown in FIG. 4.

As shown in this drawing, the folding apparatus 31 for the flexible material durability testing according to an embodiment of the present invention includes a support plate 33 being horizontal, the fixed plate 11 mounted and fixed on the support plate 33, the pivoting plate 13 placed correspondingly to the fixed plate 11, the support body 39 accommodating the pivoting plate 13 in an internal zone thereof and rotatively moving in a state of supporting the pivoting plate 13, a pivoting axle 37 supporting the support body 39, and a side bracket 43 fixed on each side of the support body 39.

First, the pivoting axle 37 is spaced horizontally from the upper surface of the support plate 33 in a state of being supported by a hinge portion 35. The center axis line of the pivoting axle 37 passes through the point Z in FIG. 1. That is, at the midway point between the fixed plate 11 and the pivoting plate 13, which are spaced apart by nRo, the center axis line horizontally passes the point spaced vertically by Ro from the flexible material 15.

The hinge portion 35 is applied here to allow the pivoting axle 37 to be located at the above-mentioned position. The hinge portion 35 supports the pivoting axle in a state of being fixed on the support plate 33, thereby allowing the support body 39 and the pivoting plate 13 to accurately perform rotative movement.

The pivoting axle 37 receives torque transmitted from the outside and performs axial rotation in a clockwise direction and an opposite direction thereof. Naturally, the support body 39 rotatively moves due to such an operation of the pivoting axle 37.

The fixed plate 11 is provided with a horizontal tight contact surface 11a. The tight contact surface 11a is a portion where a part of the flexible material 15 is tightly fixed. Fixing the flexible material 15 on the tight contact surface 11a may be implemented in various ways.

The pivoting plate 13 is a rectangular plate corresponding to the fixed plate 11 and has a tight contact surface 11b on which the other part of the flexible material 15 is tightly fixed. When the pivoting plate 13 is in the unfolded state, the tight contact surface 13b is included on the same plane as the tight contact surface 11a of the fixed plate 11.

In addition, a wall portion 13a is provided on each side of the pivoting plate 13, and a plurality of connection members 41 is fixed on each wall portion 13a. Each connection member 41 is a pin-shaped member extending to an outer direction of the pivoting plate 13 and is inserted into a corresponding guide hole 39a provided in the support body 39.

The support body 39 is a frame-type member having a substantially U-shaped shape. The lower end portion of the support body 39 is supported by the hinge portion 35 via the pivoting axle 37 in a state in which support body 39 accommodates the pivoting plate 13 in the internal zone thereof. The support body 39 rotatively moves when the pivoting axle 37 is allowed to perform axial rotation as described above. Particularly, when the support body 39 rotatively moves, the pivoting plate 13 in the internal zone of the support body 39 also rotatively moves at the same time.

As shown in FIG. 5, a plurality of connection members 41 fixed on each wall portion 13a is inserted into the guide holes 39a of the support body 39, respectively. Each connection member 41 is movable in the corresponding guide hole 39a in accordance with the rotative movement of the support body 39.

In addition, a follower pin 45 is also provided on each wall portion 13a. The follower pin 45 is inserted into a guide slot 43a of the side bracket 43 after passing through the support body 39 via an elongated hole 39b.

The side bracket 43 is a plate-like member vertically fixed on the upper portion of each hinge portion and has a guide slot 43a. The guide slot 43a is a substantially semicircular arc-shaped through hole having a constant width.

Particularly, the guide slot 43a has the same curved pattern as the material path 19 shown in FIG. 3. Eventually, the follower pin 45 moving along the guide slot 43a follows the material path 19.

As described above, the pivoting plate 13 is configured to be movable in the support body 39, whereby the support body 39 rotatively moves along the moving path 17, and the pivoting plate 13 rotatively moves along the material path 19.

Figure 6:
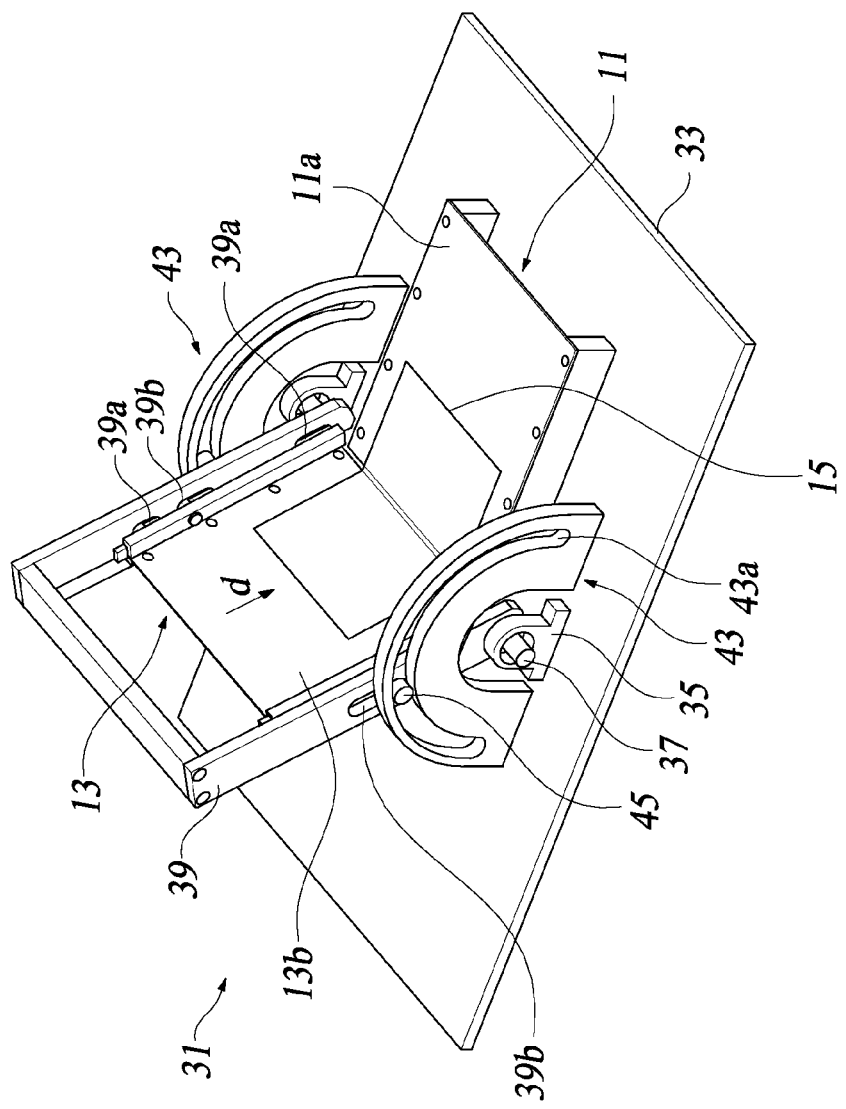
FIGS. 6 and 7 are perspective views illustrating a configuration of a folding apparatus for the flexible material durability testing according to an embodiment of the present invention and an operation thereof.
Figure 7:
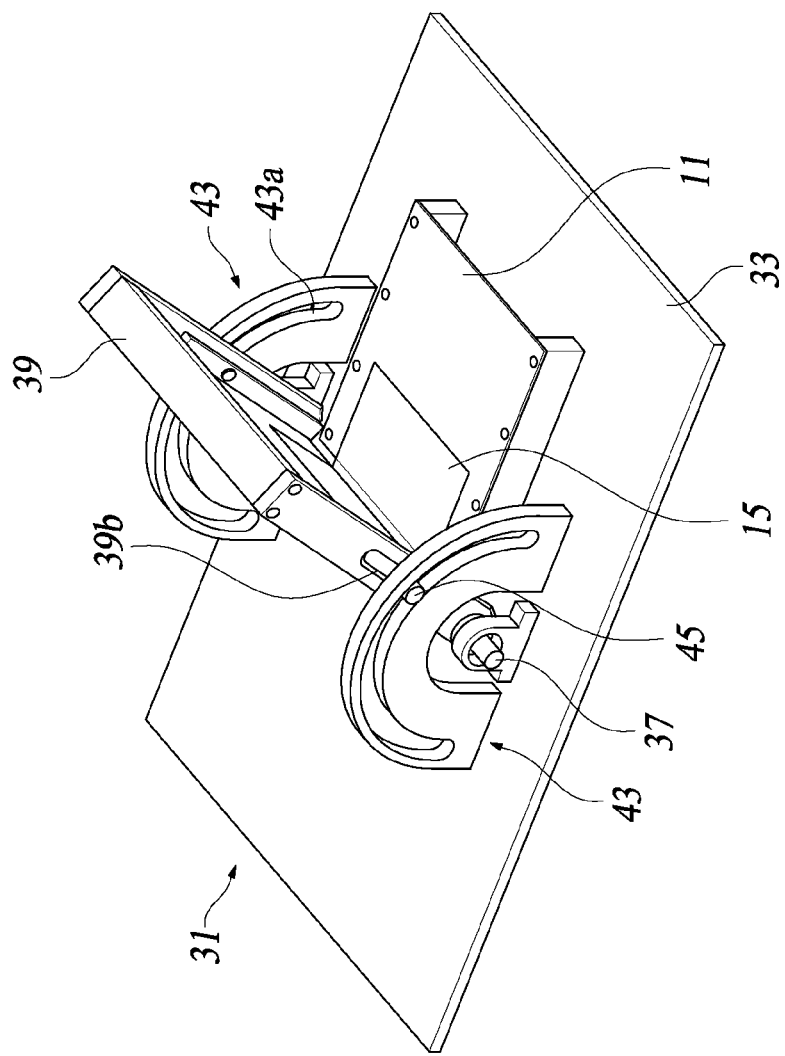

FIGS. 6 and 7 are perspective views illustrating a configuration of a folding apparatus for the flexible material durability testing according to an embodiment of the present invention and an operation thereof.

With reference to FIGS. 6 and 7, it may be noticed that a central part of the flexible material 15 fixed on the tight contact surfaces 11a and 13b of the fixed plate 11 and the pivoting plate 13, respectively, is bent.

In particular, as shown in FIG. 6, the pivoting plate 13 moves in a direction of arrow d as the support body 39 rotatively moves upwards and is raised. The movement of the pivoting plate 13 may occur due to the weight thereof or may occur because the follower pin 45 is guided by the guide slot 43a.

In any case, the pivoting plate 13 is lowered in the direction of the arrow d, whereby the tensile force in the flexible material 15 due to the rotative movement the pivoting plate 13 is not generated.

The durability test proceeds by repeating the operation in which the support body 39 is forced to rotatively move in the opposite direction after the pivoting plate 13 reaches the vertical upper position of the fixed plate 11 by further advancing the rotative movement of the support body 39.

Figure 8:
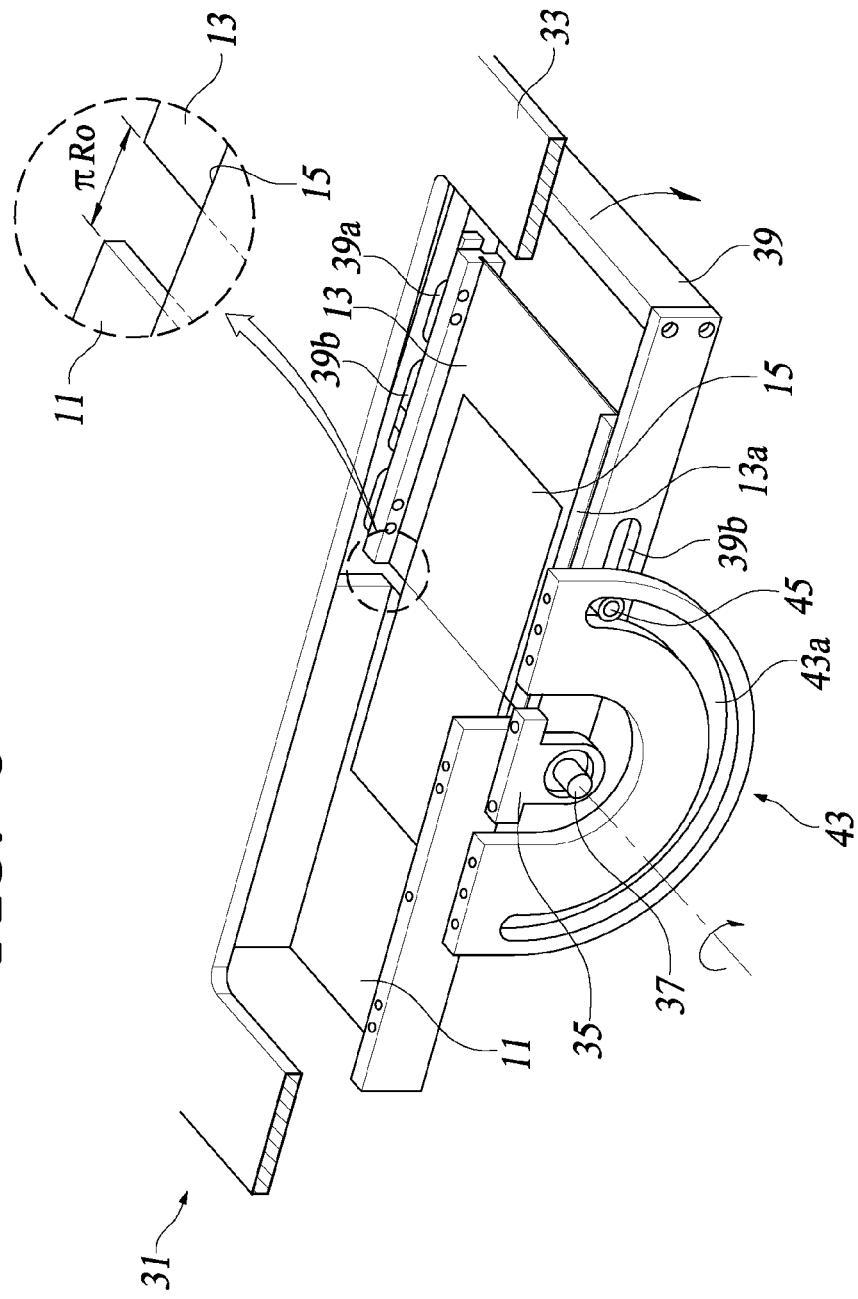
FIGS. 8 to 10 are views illustrating another structure of a folding apparatus for the flexible material durability testing according to an embodiment of the present invention and an operation thereof.
Figure 9:
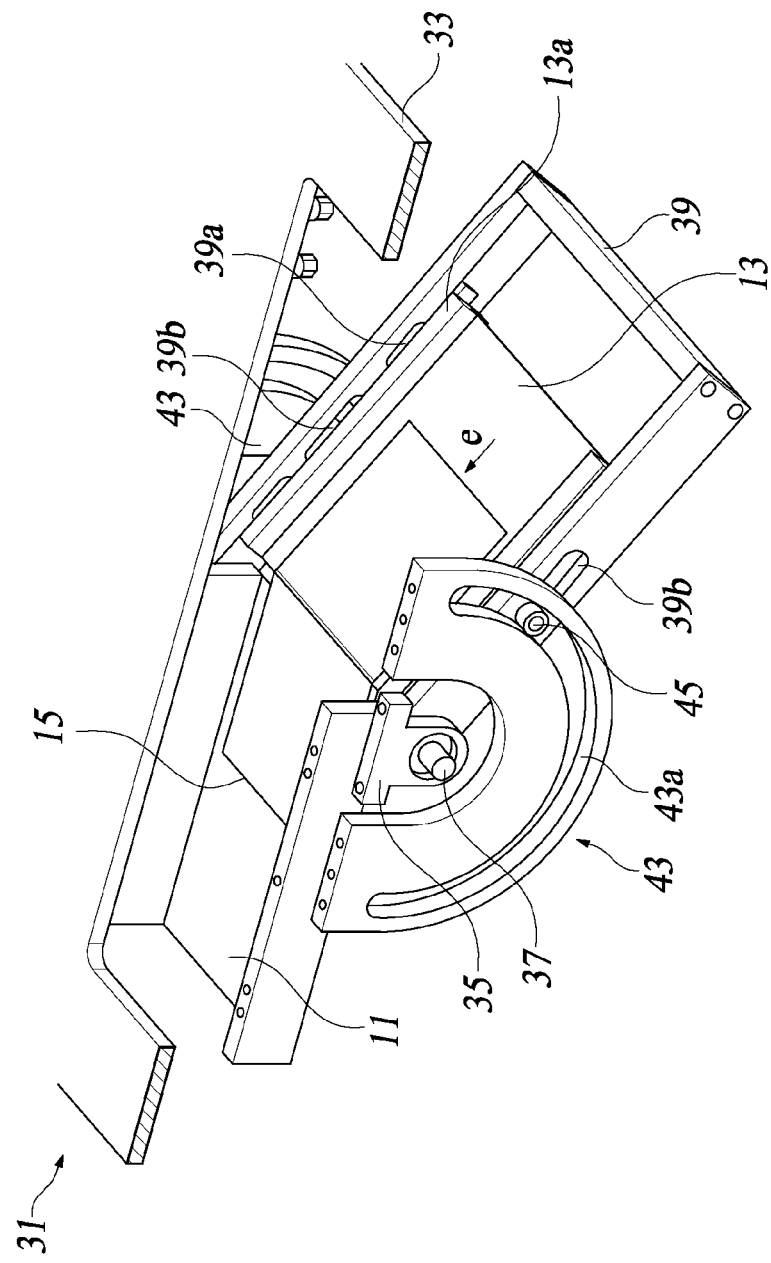
Figure 10:
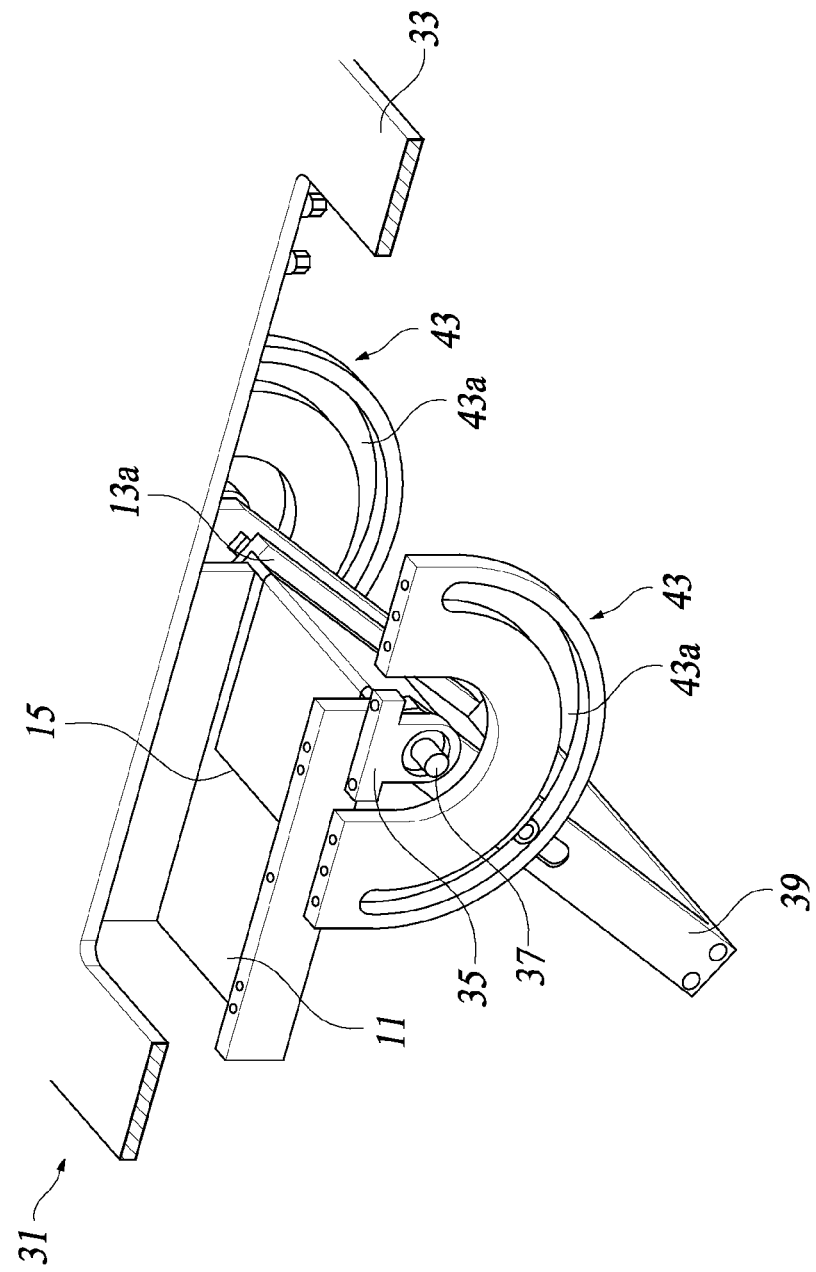

FIGS. 8 to 10 are views illustrating another structure of a folding apparatus for the flexible material durability testing according to an embodiment of the present invention and an operation thereof.

The same reference numerals as the above-mentioned reference numerals indicate the same members having the same functions.

The folding device 31 shown in FIGS. 8 to 10 is the same as the folding device described with reference to FIG. 4 except that the pivoting plate 13 rotatively moves downwards. That is, it is an out-folding apparatus for the flexible material 15 test.

Figure 2:
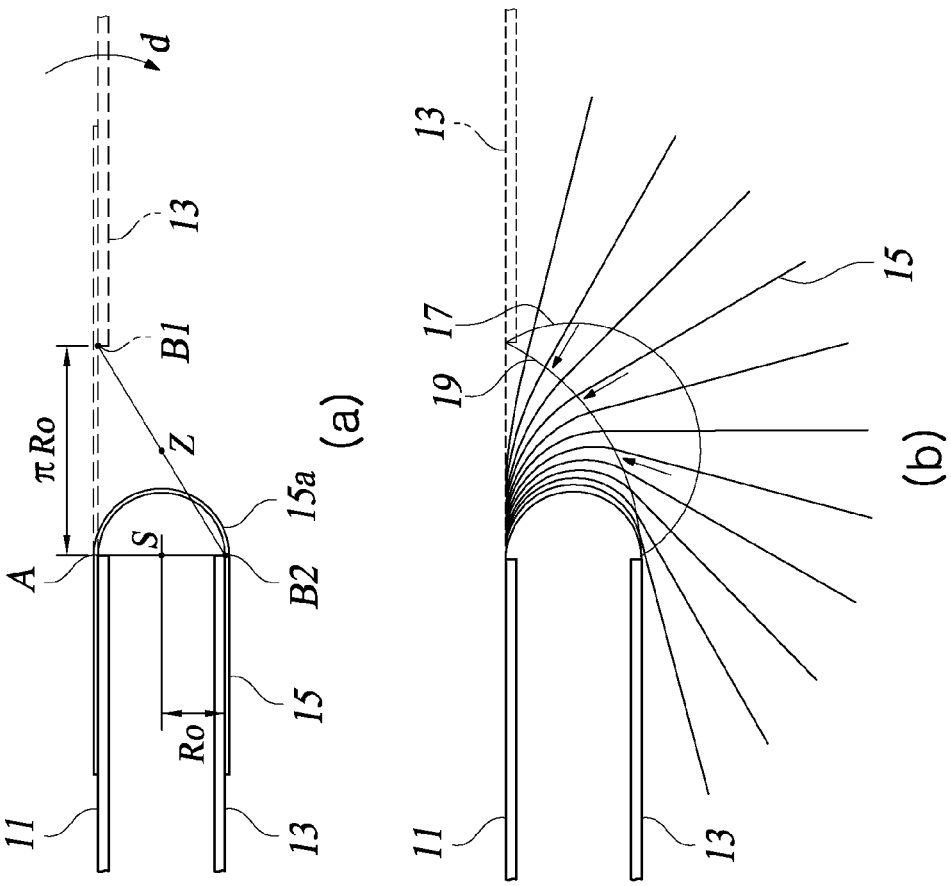
FIGS. 2a and 2b are views illustrating a concept of out-folding of a flexible material.

The extension line of the pivoting axle 37 in FIG. 8 passes horizontally through the point Z described with reference to FIG. 2. In addition, while the support body 39 rotatively moves downwards, the pivoting plate 13 moves in a direction of an arrow e, whereby the tensile force is not applied on the flexible material 15.

With reference to FIGS. 8 to 10, it may be noticed that the fixed plate 11 and the hinge portion 35 are fixed on the lower side of the support plate 33 and the hinge portion 35 is provided with the pivoting axle 37. The pivoting axle 37 receives torque transmitted from the outside and performs axial rotation bi-directionally.

In addition, the support body 39 is connected to the pivoting axle 37 and is provided with the pivoting plate in the internal zone thereof. The pivoting plate 13 rotatively moves repeatedly to bend the flexible material 15 in a state where a part of the flexible material 15 is fixed thereon, whereby testing of the durability or the lifetime of the flexible material 15 is performed.

While the present invention has been particularly shown and described with reference to exemplary embodiments thereof, it is to be understood that the invention is not limited to the disclosed exemplary embodiments, and that various modifications may be made by those skilled in the art without departing from the spirit and scope of the present invention.

INDUSTRIAL APPLICABILITY

The folding apparatus for the flexible material durability testing according to the present invention may be applied to a folding test of a flexible material in order that the flexible material is not subjected to a miscellaneous force in addition to the tensile force, thereby enhancing the testing reliability and accurately performing the durability testing.

The invention claimed is:

1. A folding apparatus for flexible material durability testing, the folding apparatus comprising:
    a material fixing part fixing a part of a flexible material to be tested;
    a pivoting plate spaced apart at a predetermined gap from the material fixing part and folding or unfolding the flexible material by rotatively moving in a state where the other part of the flexible material is fixed thereon; and
    a motion controller supporting the pivoting plate to enforce the pivoting plate to rotatively move and to allow the pivoting plate to forwardly or backwardly move with respect to the material fixing part at the same time,
    wherein the motion controller comprises a support body that rotatively moves together with the pivoting plate in a state of accommodating the pivoting plate in an internal zone thereof, and
    wherein the pivoting plate is configured to slide relative to the support body within the internal zone of the support body.

2. The folding apparatus of claim 1, wherein the material fixing part includes a fixed plate provided with a tight contact surface tightly brought into contact with the flexible material.

3. The folding apparatus of claim 2, wherein the motion controller further includes:
    a pivoting axle positioned to have an extension line thereof passing through a midway point between the fixed plate and the pivoting plate, wherein the support body is supported by the pivoting axle; and
    a sliding mechanism positioned between the support body and the pivoting plate and supporting the pivoting plate to forwardly or backwardly move.

4. The folding apparatus of claim 3, wherein the support body or the pivoting plate is provided with guide holes extending in a longitudinal direction, and the sliding mechanism includes connection members provided on the pivoting plate or the support body, inserted in the guide holes, respectively, and moving along the longitudinal direction of the guide holes.

5. The folding apparatus of claim 3, wherein the support body is provided with elongated holes extending in a direction perpendicular to a moving path of the support body, the pivoting plate is further provided with follower pins extending horizontally through the elongated holes, respectively, and a side bracket provided with a guide slot for guiding the follower pin at the time of rotative movement of the pivoting plate is provided at each side of the support body.

* * * * *